Oct. 29, 1929.   C. H. SPARKLIN   1,733,832
DAMPER CONTROL
Filed June 8, 1928   3 Sheets-Sheet 1
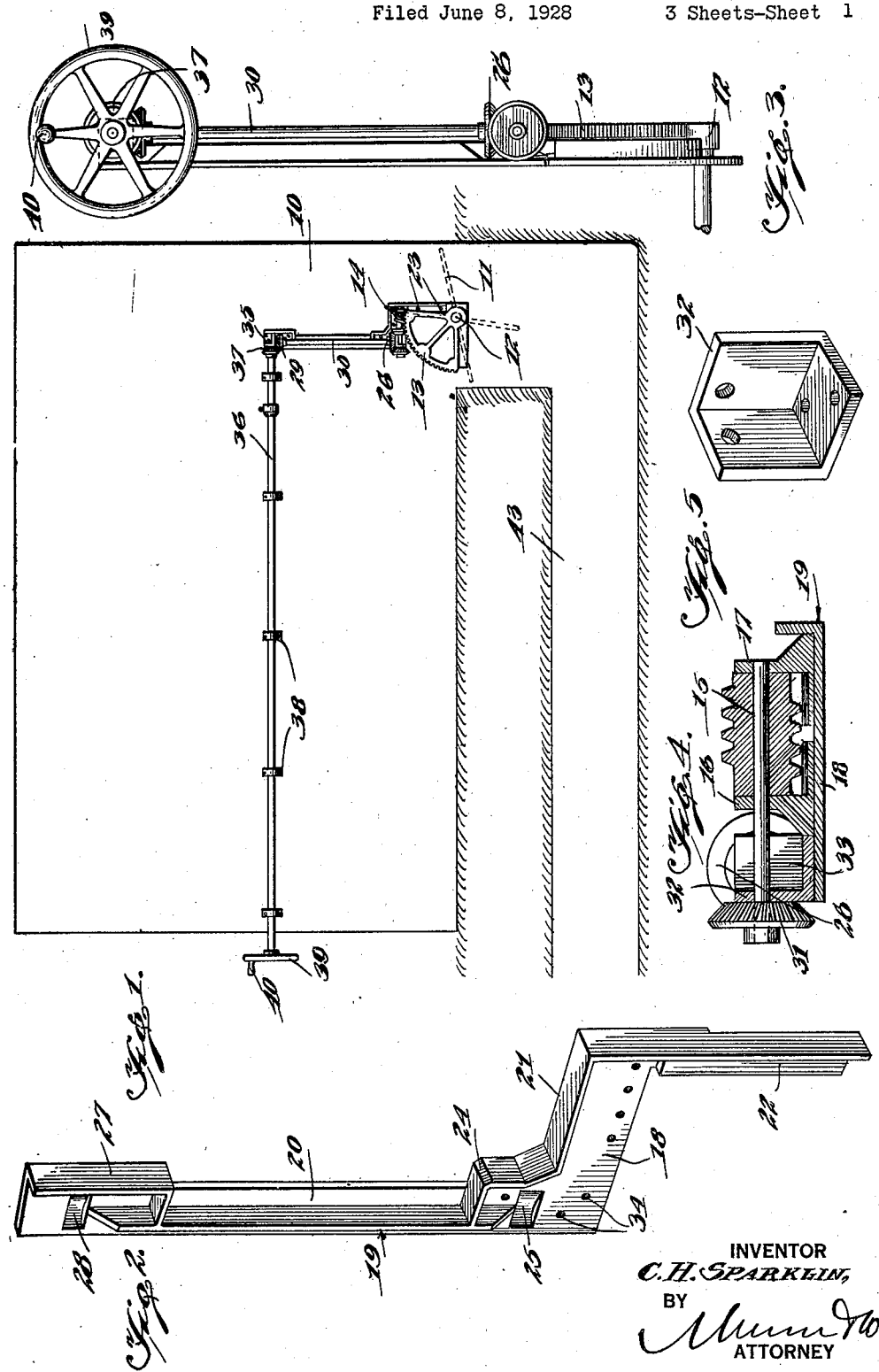
INVENTOR
C.H. SPARKLIN,
BY
ATTORNEY Oct. 29, 1929.　　C. H. SPARKLIN　　1,733,832
DAMPER CONTROL
Filed June 8, 1928　　3 Sheets-Sheet 2
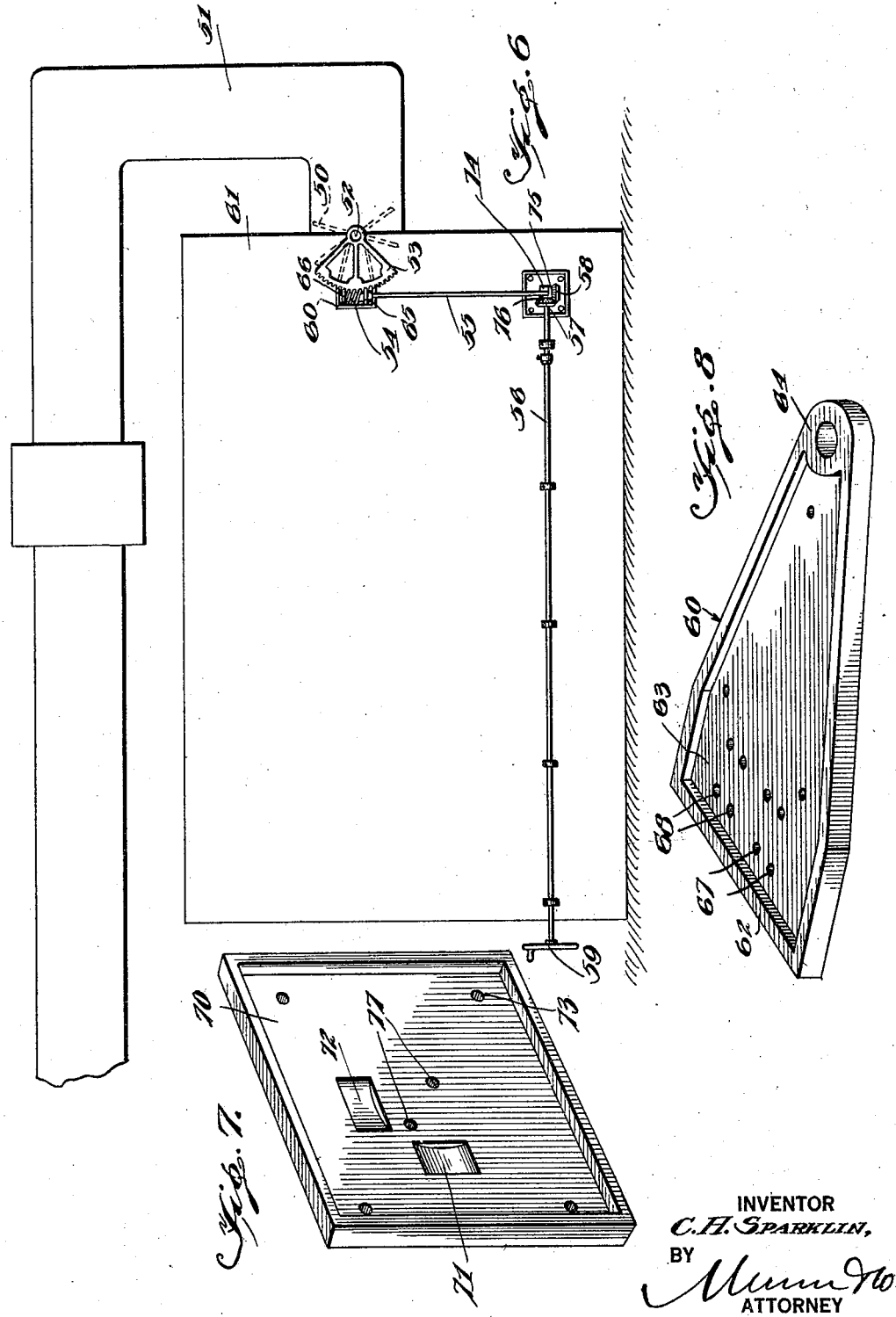
INVENTOR
C. H. Sparklin,
BY
ATTORNEY Oct. 29, 1929.                C. H. SPARKLIN                1,733,832
                               DAMPER CONTROL
                             Filed June 8, 1928            3 Sheets-Sheet 3
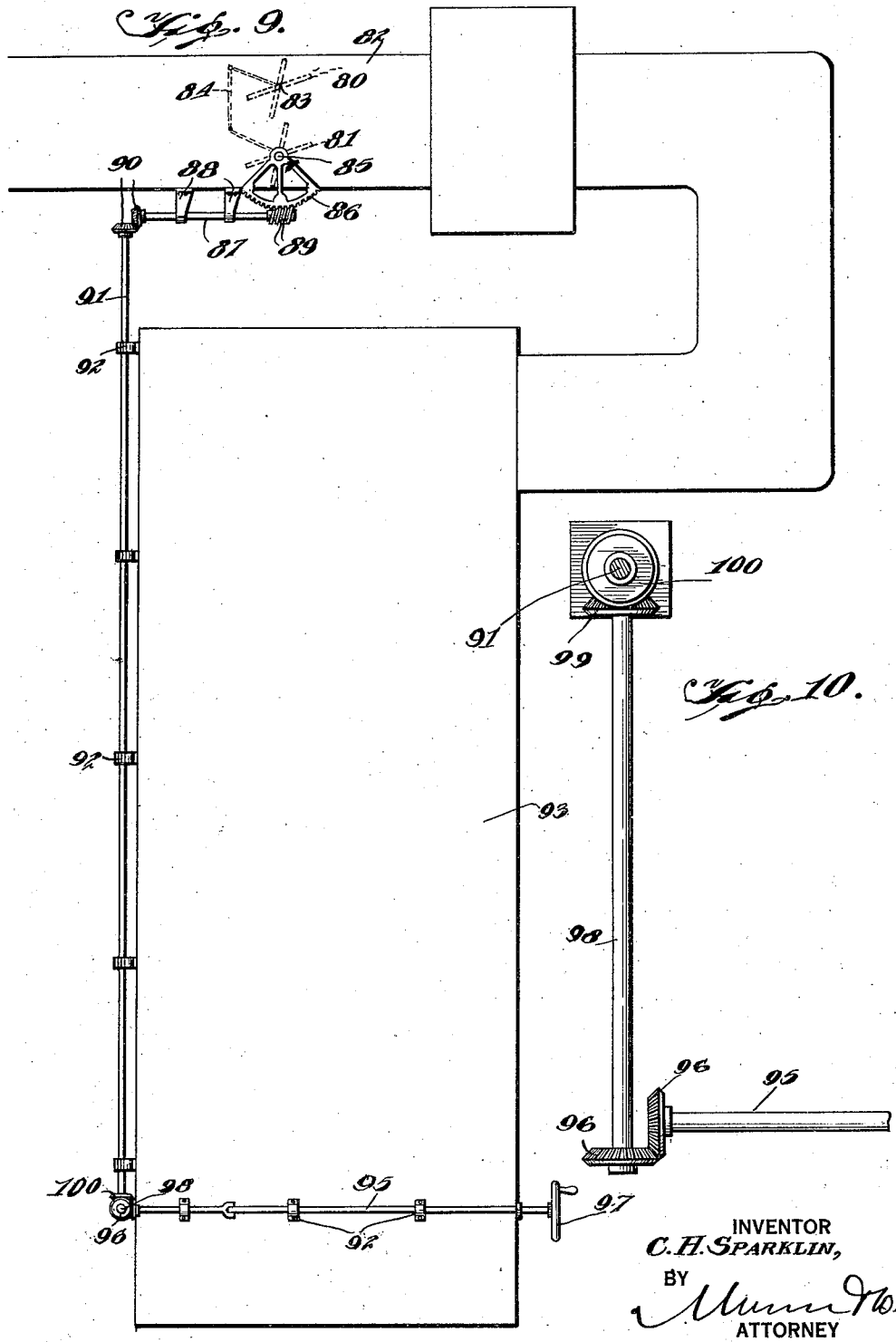
INVENTOR
C. H. SPARKLIN,
BY
ATTORNEY Patented Oct. 29, 1929

1,733,832

UNITED STATES PATENT OFFICE

CHARLES HAROLD SPARKLIN, OF TOPEKA, KANSAS

DAMPER CONTROL

Application filed June 8, 1928. Serial No. 283,869.

This invention relates to a damper control for boilers.

An object of the invention is the provision of a simple and efficient controlling means for operating a damper of a boiler which will give a minute draft control because of the fact that when the manually operated wheel is revolved through a complete revolution, the damper will be moved through a small angular degree.

A further object of the invention is the provision of a simple and efficient damper control in which the operating parts for the damper will act to maintain the damper in any position desired, and will prevent said damper from returning to its former position when the operating parts have been released.

This invention will be best understood from a consideration of the following detailed description, in connection with the accompanying drawings; nevertheless, it is to be understood that this invention is not confined to the disclosure being susceptible of such changes and modifications as shall define no material departure from the salient features of the invention as expressed in the appended claim.

In the drawings:—

Figure 1 is a side view in elevation of the damper control constructed according to the principles of my invention, Figure 2 is a view in perspective of the bracket for supporting the operating parts for the damper, Figure 3 is an enlarged end view of the damper controlling mechanism, Figure 4 is a fragmentary vertical section of a worm and its connected parts for actuating a segmental gear, Figure 5 is a view in perspective of the supporting bracket for pairs of mitered gears, Figure 6 is a side view of another form of the damper control, Figure 7 is a view in perspective of a supporting plate adapted to be connected to a boiler for maintaining a pair of mitered gears in position, together with their respective shafts, Figure 8 is a view in perspective of a bracket plate for rotatably supporting a worm gear and a segmental gear, Figure 9 is a side view in elevation of a further modified form of the damper control, Figure 10 is a horizontal section showing the means for extending the operating parts of the damper control.

Referring more particularly to the drawings, 10 designates one form of boiler having a damper 11 secured to an operating shaft 12 so that when the shaft is revolved, as will be presently explained, the damper may be moved to either open or closed position, or any fraction thereof.

A segmental worm gear 13 is rigidly secured to the shaft 12 and is in mesh with a worm 14, rigid with a shaft 15, which is mounted in brackets 16 and 17 secured to a flat portion 18 of a bracket generally designated by the numeral 19.

The bracket 19 has an upright 20 of angle iron construction formed integrally with the plate 18. A flange 21 is cast integrally with the bracket and extends into the top of the plate 18 and downwardly in angular relation with a bar 22 which is secured in any approved manner at 23, to the side wall of a boiler 10. The plate 18 with the angular member 24 connects the upright 20 to the plate 18 and is provided with a pocket 25 to receive a gear 26. A flange 27 is formed integrally with the upper end of the standard 20 and is provided with a pocket 28 to receive a portion of a gear 29. Gears 26 and 29 are secured at the opposite ends of a shaft 30.

The gear 31 is secured to the shaft 15 with the end of the shaft being located in a bearing formed in a side wall 32 of an angularly formed bracket 33 which is secured to the plate 18 by means of rivets or stud bolts passing through perforations 34.

An angularly formed bracket 35 similar to the bracket 33 is secured to the member 27 which has passages to receive an end of the shaft 36 and an adjacent end of the shaft 30, the side walls of the bracket being at right angles to each other in order to receive the mitered gears 29 and 37.

The shaft or operating rod 36 is mounted in bearings 38 secured to the outer wall of the boiler 10. An end wall 39 is fastened to the outer end of the shaft 36 and is provided with a crank 40 for causing rotation of the wheel and likewise the shaft 36.

The operation of the device shown in Figs. 1 to 5 inclusive is as follows: The hand wheel 39 is of sufficient diameter that when it is revolved through one revolution, the worm 14 and likewise the segmental gear 13 will have a limited angular rotation of approximately 4° so that the damper 11 is moved only at a slight angle during each rotation of the wheel 39. By this movement the damper may be moved through angular increments which will progressively vary the control of gas or hot air in the conduit 43. The particular construction of the worm 14 forming one of the operating parts in connection with the segmental worm gear 13 provides a lock for not only positioning the damper 11, but for positively retaining the damper in such position when the operating parts have been released by the hand. This is due to the fact that no matter what weight acts on the worm gear 13 it can not be actuated when in engagement with the worm 14.

Referring more particularly to the construction shown in Figs. 6 to 8 inclusive, it will be seen that a slightly modified form of the invention is employed for operating a damper 50 for controlling the flow of hot air or gas through the pipe 51. The damper is made rigid with a shaft 52 to which is also rigidly connected a segmental worm gear 53 meshing with a worm 54.

A shaft 55 being rigid with the worm 54 drives said worm, the shaft in turn being driven by a shaft 56 through a pair of mitered gears 57 and 58. The gear 57 is rigid with the shaft 56 while gear 58 is rigid with shaft 55. A hand wheel 59 secured to the outer projecting end of the shaft 56 is provided for manual rotation of said shaft.

A plate 60 secured to the side wall of a boiler 61 has an expanded portion 62 at one end which tapers downwardly towards a bearing 64 which provides a mounting for the shaft 51. A pair of brackets 65 and 66 are secured by means of rivets or stud bolts and perforations 67 and 68, respectively, to the plate 60. These brackets are provided with passages to engage the shaft 55 upon opposite sides of the worm 54.

A plate 70 is secured to one wall of the boiler 61 and has a pocket 71 to receive a portion of the gear 58, while a pocket 72 receives a portion of the gear 57. Perforations 73 are formed in the plate for the purpose of securing the plate by means of rivets or stud bolts to the boiler.

A bracket 74 has right angularly disposed flanges 75 and 76 which have bearings for supporting respectively, the adjacent ends of the shafts 55 and 56. The bracket 74 is secured by means of rivets or stud bolts passing through perforations 77 in the plate 70.

The operation of the device shown in Figs. 6 to 8 inclusive is similar in all respects to that shown in Figs. 1 to 5 inclusive. When the hand wheel 59 is revolved through 360° the worm 54 and the gear 53 cover an angular rotation of approximately 4° for the damper 50. By this construction it is possible to move the damper by small angular increments, thereby preventing excessive opening or closing of the damper. Furthermore, the worm and gear construction permits movement of the damper to any position desired while the locking element between the worm and gear prevents the damper from moving from its predetermined position.

Referring more particularly to Figs. 9 and 10 it will be seen that a modified form of arrangement is provided for controlling a plurality of dampers 80 and 81 in a conduit 82. Damper 80 is rigid with a shaft 83 mounted in the conduit 82 and is adapted to be rocked by a link arrangement generally designated by the numeral 84. The link arrangement is also connected with a shaft 85 to which damper 81 is secured. Said shaft projects beyond conduit 82 and a segmental gear 86 is secured to the extension of the shaft.

A shaft 87 is carried by brackets 88 and has a worm 89 meshing with the segmental gear 86. A pair of mitered gears 90 are secured to the adjacent ends of a shaft 91 and the shaft 87. The last mentioned shaft 91 is mounted in bearings 92 carried by a boiler 93. An operating shaft 95 is mounted in bearings 92ª secured to one wall of the boiler 93 and is connected with a hand wheel 97 whereby the shaft may be rotated. A pair of mitered gears 96 are connected to the adjacent ends of the shaft 95 and the shaft 98 running at right angles to the shaft 95. A gear 99 at one end of the shaft 98 meshes with a gear 100 secured to the shaft 91.

The operation of the device shown in Figs. 9 and 10 is as follows: The hand wheel 97 is revolved actuating the shafts 95, 98, 91 and 87, thereby causing the worm 89 to drive the segmental gear 86. Rocking of the gear 86 causes rocking of the shafts 83 and 85 and likewise the dampers 80 and 81. The dampers 80 and 81 are simultaneously moved and cooperate to close the passage in the conduit 82 or for opening said conduit to permit the draft therein. A complete revolution of the handle 97 will cause an angular rocking movement of approximately 4° of a damper in the conduit 82.

I claim:—

An operating device for a damper comprising an actuating shaft, a worm on the shaft, a segmental toothed gear in mesh with the worm, means for rotating said shaft, the damper being connected with the segmental gear for simultaneous rocking movement, the worm and segmental gear operating to hold the damper in any predetermined position desired, a bracket having an intermediate plate provided with bearings for supporting the worm, a bar depending from the plate and having means for supporting a segmental gear, said plate having an upward extension and provided with means for supporting the operating means for the shaft.

Signed at Topeka in the county of Shawnee and State of Kansas this 31st day of May, A. D. 1928.

CHARLES HAROLD SPARKLIN.